US006910221B1

(12) United States Patent
Honda

(10) Patent No.: US 6,910,221 B1
(45) Date of Patent: Jun. 21, 2005

(54) MOVING IMAGE COMMUNICATION EVALUATION SYSTEM AND MOVING IMAGE COMMUNICATION EVALUATION METHOD

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/517,203

(22) Filed: Mar. 2, 2000

(30) Foreign Application Priority Data

Mar. 26, 1999 (JP) .......................................... 11-084754

(51) Int. Cl.[7] ................................................ H04N 7/173

(52) U.S. Cl. .......................... 725/93; 725/116; 725/131

(58) Field of Search ................................ 725/131, 132, 725/91, 93, 103, 104, 114, 116, 117; 714/719, 819, 821

(56) References Cited

U.S. PATENT DOCUMENTS 5,333,137 A * 7/1994 Fujiyama .................... 714/821
5,812,780 A * 9/1998 Chen et al. ................. 709/224
5,930,252 A * 7/1999 Aaker et al. ............. 370/395.2
6,006,260 A * 12/1999 Barrick et al. .............. 709/224
6,021,439 A * 2/2000 Turek et al. ................ 709/224
6,076,104 A * 6/2000 McCue ....................... 709/219
6,108,700 A * 8/2000 Maccabee et al. .......... 709/224
6,178,395 B1 * 1/2001 Gee ............................ 703/22
6,178,449 B1 * 1/2001 Forman et al. ............. 709/224

* cited by examiner

*Primary Examiner*—Chris Grant
*Assistant Examiner*—Dominic Saltarelli
(74) *Attorney, Agent, or Firm*—Fish & Richardson P.C.

(57) ABSTRACT

A start point time measurement section 53 measures the time at which a moving image request is input as start point time and a start point time determination section 59 determines whether the start point time is valid or invalid, and outputs only the valid start point time to a response time calculation section 52; an end point time measurement section 54 measures the time at which moving image display is started and an end point time determination section 58 determines whether the end point time measured by the end point time measurement section 54 is valid or invalid, and outputs only the valid end point time to the response time calculation section 52; and the response time calculation section 52 calculates the difference between the start point time and the end point time as the response time and an evaluation system 40 evaluates the satisfaction degree of the user at the response time and the like for monitoring and managing the response time in moving image service.

4 Claims, 4 Drawing Sheets

MOVING IMAGE COMMUNICATION EVALUATION SYSTEM AND MOVING IMAGE COMMUNICATION EVALUATION METHOD

BACKGROUND OF THE INVENTION

1. Field of the Invention

This invention relates to a moving image communication evaluation system and a moving image communication evaluation method and more particularly to a moving image communication evaluation system and a moving image communication evaluation method for evaluating a response time of moving image display to a moving image request in moving image distribution service on a network.

2. Description of the Related Art

In recent years, a moving image service industry of distributing moving images on a communication network has become prevalent. In the moving image service industry, the degree of satisfaction of the user requesting a moving image is important and the response time to the user's request is also one of the factors for determining the quality in the moving image service. Since moving image communication tends to take much time in processing of transmission, reception, decoding, display, etc., as compared with voice communication and data a communication, it is important to monitor and manage the response time to the user's request.

Hitherto, for example, a moving image communication evaluation system as described in JP-A-7-121459 and that as described in JP-A-5-336209 have been known as systems for measuring and evaluating the response time when a moving image is transmitted and received between communication terminals via a network. A configuration example of a moving image communication evaluation system in a related art shown in FIG. 4 is provided by simplifying the configuration described in JP-A-7-121459, wherein a relay node 33 comprising a response time measurement section 6 and a relay node 34 comprising a response time measurement section 7 are connected to a network 10 and communication terminals 31 and 32 are connected to the relay nodes 33 and 34 respectively.

When a transmission request packet addressed to the communication terminal 32 is transmitted from the communication terminal 31 to the relay node 33, the relay node 33 passes the transmission request packet to the network 10. The communication terminal 32 receives the transmission request packet transmitted on the network 10 via the relay node 34 and transmits, for example, a reply packet addressed to the communication terminal 31 in response to the request in the transmission request packet. The reply packet is transmitted through the relay node 34, the network 10, and the relay node 33 and is received at the communication terminal 31.

The response time measurement section 6 in the relay node 33 measures the difference between the time at which the relay node 33 passes the transmission request packet and the time at which the relay node 33 passes the reply packet as the response time. In contrast, if a transmission request packet addressed to the communication terminal 31 is transmitted from the communication terminal 32 and a reply packet addressed to the communication terminal 32 is transmitted from the communication terminal 31, the response time measurement section 7 in the relay node 34 measures the difference between the time at which the relay node 34 passes the transmission request packet and the time at which the relay node 34 passes the reply packet as the response time.

A configuration example of a moving image communication evaluation system in a related art shown in FIG. 5 is provided by simplifying the configuration described in JP-A-5-336209, wherein a communication terminal 35 comprising a response time measurement section 8 and a communication terminal 36 comprising a response time measurement section 9 are connected to a network 10. When a transmission request packet is transmitted from the communication terminal 35 through the network 10 to the communication terminal 36, the communication terminal 36 receives the transmission request packet and transmits, for example, a reply packet through the network 10 to the communication terminal 35 in response to the request in the transmission request packet. The communication terminal 35 receives the reply packet.

The response time measurement section 8 in the communication terminal 35 measures the difference between the time at which the communication terminal 35 transmits the transmission request packet and the time at which the communication terminal 35 receives the reply packet as the response time. In contrast, if a transmission request packet is transmitted from the communication terminal 36 to the communication terminal 35 and a reply packet is transmitted from the communication terminal 35 to the communication terminal 36, the response time measurement section 9 in the communication terminal 36 measures the difference between the time at which the communication terminal 36 transmits the transmission request packet and the time at which the communication terminal 36 receives the reply packet as the response time.

However, if importance is placed on the degree of satisfaction of the user in the moving image service, the response time that the user feels, namely, the time interval between the instant at which the user performs operation of making a moving image request and the instant at which moving image display is changed as requested by the user must be measured, monitored, and managed. For example, in the moving image communication evaluation system in the related art as shown in FIG. 4, if a moving image transmission request packet is transmitted from the communication terminal 31, only the time of "the packet traveling time between the relay node 33 connected to the communication terminal 31 and the communication terminal 32 transmitting the requested moving image" plus "the request processing time of the communication terminal 32 transmitting the requested moving image" is measured. In the moving image communication evaluation system in the related art as shown in FIG. 5, only the time of "the packet traveling time between the communication terminals" plus "the request processing time of the communication terminal transmitting the requested moving image" is measured. Thus, the moving image communication evaluation systems in the related arts cannot measure or evaluate the response time that the user feels.

Various types of communication networks become widespread; for example, the Internet, LANs (local area networks), public telephone networks, cable television networks, optical fiber networks, cellular mobile telephone networks, satellite communication networks, etc., can be used. Moreover, among the various communication networks, a heterogeneous network where different types of networks are interconnected is often used between communication terminals and a large number of types of communication protocols are actually used. Further, the types of networks to which terminals that can access one server are directly connected are various. Thus, the moving image communication evaluation system in the related art as shown in FIG. 4 involves a large number of types of relay nodes 33 and 34 in which the response time measurement sections 6 and 7 are to be imbedded for which design, development, and evaluation must be carried out separately.

The communication networks are advancing rapidly and enlargement of a geographic area, change in network topology, improvement in, new installation of, and change in methods, systems, apparatus, protocols, terminals, and service, and the like are executed from day to day. Thus, in the moving image communication evaluation system in the related art as shown in FIG. 4, whenever the relay node 33, 34 is improved or newly installed, the response time measurement section 6, 7 must be improved or installed and evaluated accordingly.

Further, in the cellular mobile telephone networks, the satellite communication networks, the wireless LANs, etc., the geographical positions of the communication terminals change frequently and the radio transmission characteristics change in quality, namely, are good or bad from time to time, so that the transmission error occurrence frequency grows and in the Internet, packet discharge at heavy traffic hours occurs frequently, thus a moving image display error often occurs. A moving image communication evaluation system that can measure and evaluate the response time that the user feels if such a display screen error occurs is demanded. For the moving image service dealers and managers, the response time that the user feels is at stake and therefore a moving image server terminal does not require a response time measurement section. Thus, such a moving image communication evaluation system wherein only user terminals are provided each with a response time measurement section is demanded.

SUMMARY OF THE INVENTION

It is therefore an object of the invention to provide a moving image communication evaluation system that can measure and evaluate the response time that the user feels in response to the variety of networks, network chance, a transmission error, etc.

According to a first aspect of the present invention, there is provided a moving image communication evaluation system comprising:

a moving image response time measurement unit being installed in a client communication terminal for transmitting a moving image request to a moving image server communication terminal connected to the client communication terminal via a network and receiving and displaying a moving image transmitted from the moving image server communication terminal in response to the moving image request, the moving image response time measurement unit for measuring the response time between the moving image request and moving image display state change; and a moving image response time evaluation unit for receiving the response time transmitted from the moving image response time measurement unit through the network and evaluating the response time in the moving image communication between the moving image server communication terminal and the client communication terminal, characterized in that the moving image response time measurement unit comprises:

start point time measurement means for measuring the time at which the client communication terminal accepts the moving image request as start point time;

end point time measurement means for measuring the time at which a moving image display state is changed in accordance with the moving image request as end point time; and response time calculation means for calculating the time between the start point time and the end point time as the response time, and that the moving image response time evaluation unit receives the response time transmitted from the moving image response time measurement unit and evaluates the satisfaction degree of the user at the response time.

According to the first aspect of the present invention, in a moving image communication evaluation system comprising a moving image response time measurement unit being installed in a client communication terminal for transmitting a moving image request to a moving image server communication terminal connected to the client communication terminal via a network and receiving and displaying a moving image transmitted from the moving image server communication terminal in response to the moving image request, the moving image response time measurement unit for measuring the response time between the moving image request and moving image display state change, and a moving image response time evaluation unit for receiving the response time transmitted from the moving image response time measurement unit through the network and evaluating the response time in the moving image communication between the moving image server communication terminal and the client communication terminal, start point time measurement means contained in the moving image response time measurement unit measures the time at which the client communication terminal accepts the moving image request as start point time, end point time measurement means measures the time at which a moving image display state is changed in accordance with the moving image request as end point time, response time calculation means calculates the time between the start point time and the end point time as the response time, and the moving image response time evaluation unit receives the response time transmitted from the moving image response time measurement unit and evaluates the satisfaction degree of the user at the response time.

According to a second aspect of the present invention, in the moving image communication evaluation system, the moving image response time measurement unit further includes:

moving image display anomaly detection means for detecting an anomaly of moving image display; and duration measurement means for measuring the time during which the moving image display continues normally, wherein if an anomaly is detected by the moving image display anomaly detection means and the duration measured by the duration measurement means is less than a predetermined allowed time, the end point time measurement means determines the measured end point time invalid and if an anomaly is not detected by the moving image display anomaly detection means and the duration measured by the duration measurement means is equal to or greater than the predetermined allowed time, the end point time measurement means determines the measured end point time valid and measures the end point time, and wherein if an anomaly is detected by the moving image display anomaly detection means and the duration measured by the duration measurement means is less than the predetermined allowed time, the start point time measurement means determines that the start point time measured just after it is invalid and if an anomaly is not detected by the moving image display anomaly detection means and the duration measured by the duration measurement means is equal to or greater than the predetermined allowed time, the start point time measurement means determines that the start point time measured just after it is valid, and measures the start end time.

According to the second aspect of the present invention, in the moving image communication evaluation system, the moving image display anomaly detection means installed in the moving image response time measurement unit detects an anomaly of moving image display, the duration measurement means measures the time during which the moving image display continues normally, if an anomaly is detected by the moving image display anomaly detection means and the duration measured by the duration measurement means is less than the predetermined allowed time, the end point time measurement means determines the measured end point time invalid and if an anomaly is not detected by the moving image display anomaly detection means and the duration measured by the duration measurement means is equal to or greater than the predetermined allowed time, the end point time measurement means determines the measured end point time valid and measures the end point time, and if an anomaly is detected by the moving image display anomaly detection means and the duration measured by the duration measurement means is less than the predetermined allowed time, the start point time measurement means determines that the start point time measured just after it is invalid and if an anomaly is not detected by the moving image display anomaly detection means and the duration measured by the duration measurement means is equal to or greater than the predetermined allowed time, the start point time measurement means determines that the start point time measured just after it is valid, and measures the start end time.

According to a third aspect of the present invention, the moving image communication evaluation system further includes:

storage means for previously storing a time interval between the instant at which the moving image request is input to the client communication terminal and the instant at which the moving image request is accepted in the client communication terminal; and start point time correction means for subtracting the time interval stored in the storage means from the start point time measured by the start point time measurement means, thereby correcting the start point time, wherein the response time calculation means calculates the response time based on the start point time corrected by the start point time correction means.

According to the third aspect of the present invention, in the moving image communication evaluation system, the storage means previously stores a time interval between the instant at which the moving image request is input to the client communication terminal and the instant at which the moving image request is accepted in the client communication terminal, the start point time correction means subtracts the time interval stored in the storage means from the start point time measured by the start point time measurement means, thereby correcting the start point time, and the response time calculation means calculates the response time based on the start point time corrected by the start point time correction means.

According to a fourth aspect of the present invention, there is provided a moving image communication evaluation method for measuring the response time between a moving image request and moving image display state change in a client communication terminal for transmitting the moving image request to a moving image server communication terminal connected to the client communication terminal via a network and receiving and displaying a moving image transmitted from the moving image server communication terminal in response to the moving image request, then receiving the response time through the network and evaluating the response time in the moving image communication between the moving image server communication terminal and the client communication terminal, the moving image communication evaluation method comprising:

the start point time measurement step of measuring the time at which the client communication terminal accepts the moving image request as start point time;

the end point time measurement step of measuring the time at which a moving image display state is changed in accordance with the moving image request as end point time;

the response time calculation step of calculating the time between the start point time and the end point time as the response time, thereby measuring the response time; and the step of receiving the response time and evaluating the satisfaction degree of the user at the response time.

According to the fourth aspect of the present invention, in a moving image communication evaluation method for measuring the response time between a moving image request and moving image display state change in a client communication terminal for transmitting the moving image request to a moving image server communication terminal connected to the client communication terminal via a network and receiving and displaying a moving image transmitted from the moving image server communication terminal in response to the moving image request, then receiving the response time through the network and evaluating the response time in the moving image communication between the moving image server communication terminal and the client communication terminal, the start point time measurement step measures the time at which the client communication terminal accepts the moving image request as start point time, the end point time measurement step measures the time at which a moving image display state is changed in accordance with the moving image request as end point time, the response time calculation step calculates the time between the start point time and the end point time as the response time, thereby measuring the response time, and the evaluation step receives the response time and evaluates the satisfaction degree of the user at the response time.

Since the moving image response time measurement unit is installed in the client communication terminal, it is made possible to easily measure and evaluate the response time in the moving image communication in response to the variety of networks and the network change. Since the time between the moving image request and moving image display state change can be measured as the response time, the response time almost equal to the response time that the user feels can be measured and it is made possible to more accurately evaluate the satisfaction degree of the user at the response time.

According to a fifth aspect of the present invention, the moving image communication evaluation method further comprises:

the moving image display anomaly detection step of detecting an anomaly of moving image display; and the duration measurement step of measuring the time during which the moving image display continues normally, wherein if an anomaly is detected by the moving image display anomaly detection step and the duration measured by the duration measurement step is less than a predetermined allowed time, the end point time measurement step determines the measured end point time invalid and if an anomaly is not detected by the moving image display anomaly detection step and the duration measured by the duration measurement step is equal to or greater than the predetermined allowed time, the end point time measurement step determines the measured end point time valid and measures the end point time, and wherein if an anomaly is detected by the moving image display anomaly detection step and the duration measured by the duration measurement step is less than the predetermined allowed time, the start point time measurement step determines that the start point time measured just after it is invalid and if an anomaly is not detected by the moving image display anomaly detection step and the duration measured by the duration measurement step is equal to or greater than the predetermined allowed time, the start point time measurement step determines that the start point time measured just after it is valid, and measures the start end time.

According to the fifth aspect of the present invention, in the moving image communication evaluation method, the moving image display anomaly detection step detects an anomaly of moving image display, the duration measurement step measures the time during which the moving image display continues normally, if an anomaly is detected by the moving image display anomaly detection step and the duration measured by the duration measurement step is less than a predetermined allowed time, the end point time measurement step determines the measured end point time invalid and if an anomaly is not detected by the moving image display anomaly detection step and the duration measured by the duration measurement step is equal to or greater than the predetermined allowed time, the end point time measurement step determines the measured end point time valid and measures the end point time, and if an anomaly is detected by the moving image display anomaly detection step and the duration measured by the duration measurement step is less than the predetermined allowed time, the start point time measurement step determines that the start point time measured just after it is invalid and if an anomaly is not detected by the moving image display anomaly detection step and the duration measured by the duration measurement step is equal to or greater than the predetermined allowed time, the start point time measurement step determines that the start point time measured just after it is valid, and measures the start end time.

Therefore, although the moving image display state is changed in response to the moving image request, if the moving image display stops in a short time because of a moving image display anomaly or a malfunction occurs and the user does not feel that the moving image display state is changed as requested, measurement of the response time is continued. If the moving image display state changed in response to a moving image request continues for the predetermined allowed time or longer from the time at which the moving image request is accepted or an anomaly does not occur, the time to the moving image display state change time is measured as the response time. Thus, even when a moving image display anomaly easily occurs in a communication environment, etc., wherein a transmission error and packet discard often occur, the response time that the user feels can be measured in response to the moving image display state change caused by an anomaly, and the satisfaction degree of the user at the response time can be evaluated.

According to a sixth aspect of the present invention, the moving image communication evaluation method further comprises:

the storage step of previously storing a time interval between the instant at which the moving image request is input to the client communication terminal and the instant at which the moving image request is accepted in the client communication terminal; and the start point time correction step of subtracting the time interval stored in the storage step from the start point time measured by the start point time measurement step, thereby correcting the start point time, wherein the response time calculation step calculates the response time based on the start point time corrected by the start point time correction step.

According to the sixth aspect of the present invention, in the moving image communication evaluation method, the storage step previously stores a time interval between the instant at which the moving image request is input to the client communication terminal and the instant at which the moving image request is accepted in the client communication terminal, the start point time correction step subtracts the time interval stored in the storage step from the start point time measured by the start point time measurement step, thereby correcting the start point time, and the response time calculation step calculates the response time based on the start point time corrected by the start point time correction step.

Therefore, the time between the instant at which the moving image request is input to the client communication terminal and the instant at which the moving image display state is changed can be measured as the response time. Thus, the response time that the user feels can be measured more accurately and the satisfaction degree of the user at the response time can be evaluated more accurately.

DETAILED DESCRIPTION OF THE PRESENT INVENTION

Referring now to the accompanying drawings, there is shown an embodiment of the invention.

Figure 1:
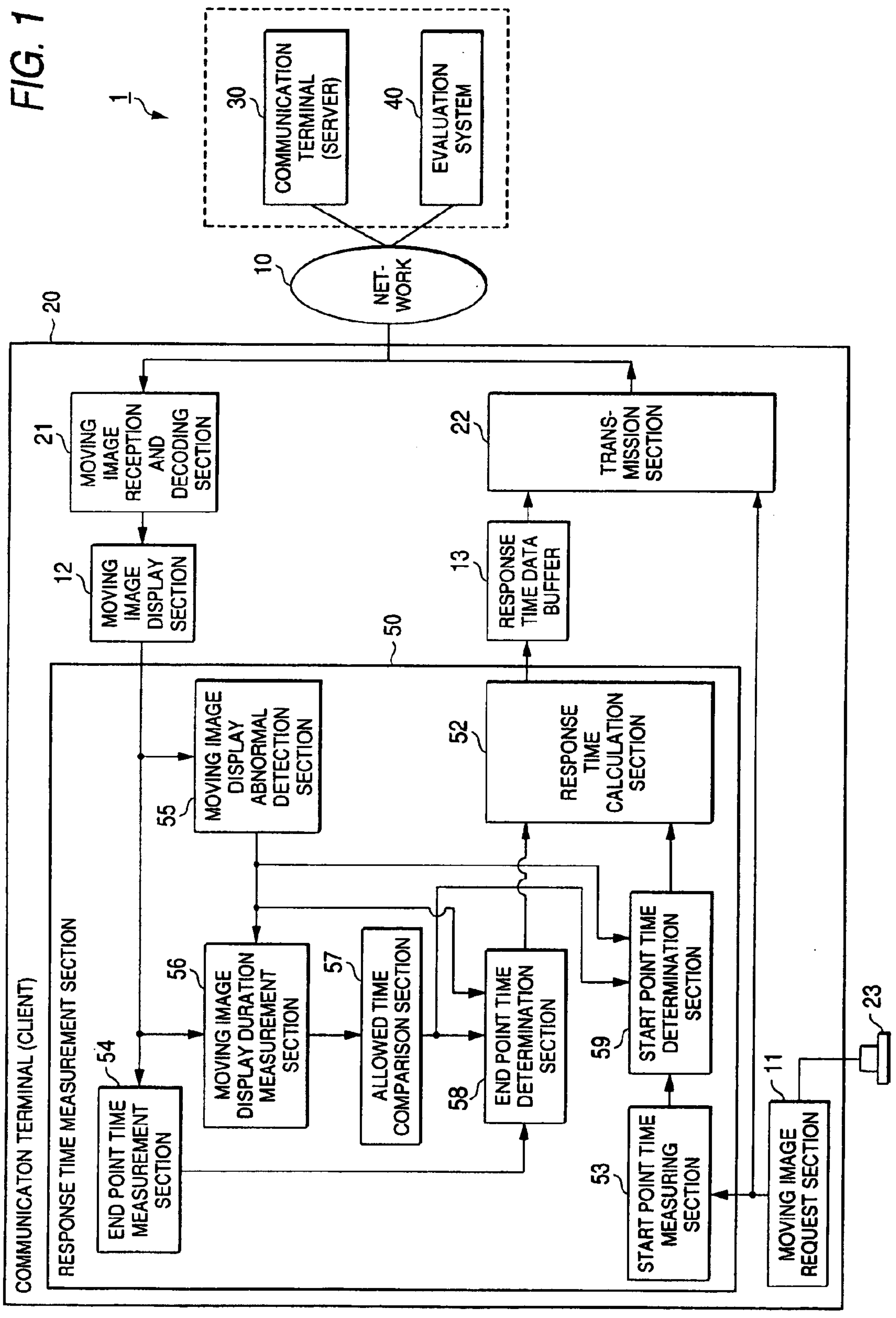
FIG. 1 is a block diagram to show the general configuration of a moving image communication evaluation system 1 as one embodiment incorporating the invention.
Figure 2:
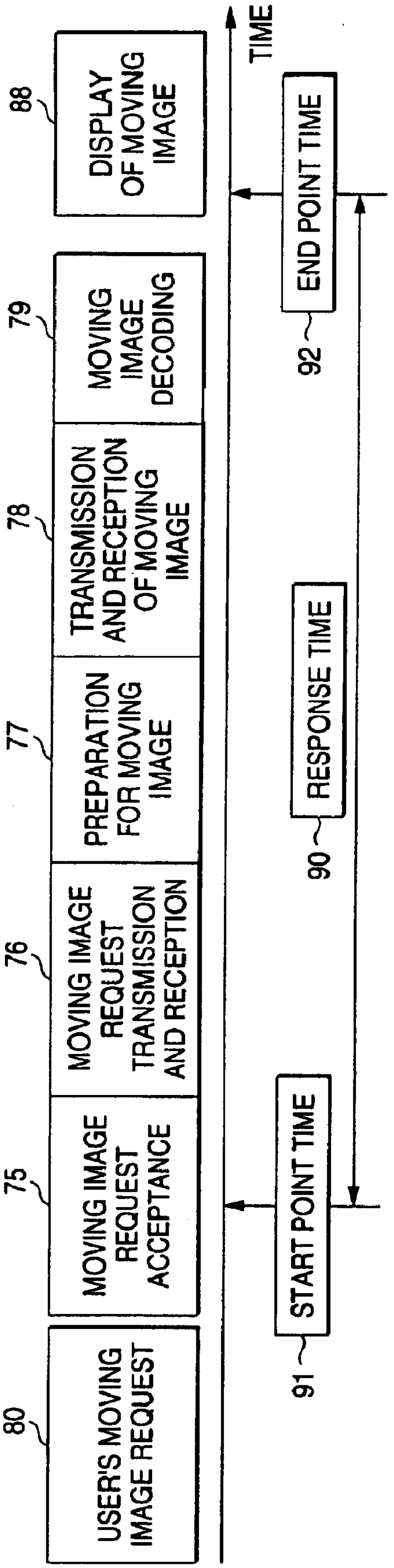
FIG. 2 is a drawing to show a moving image communication state between communication terminals 20 and 30 in FIG. 1.
Figure 3:
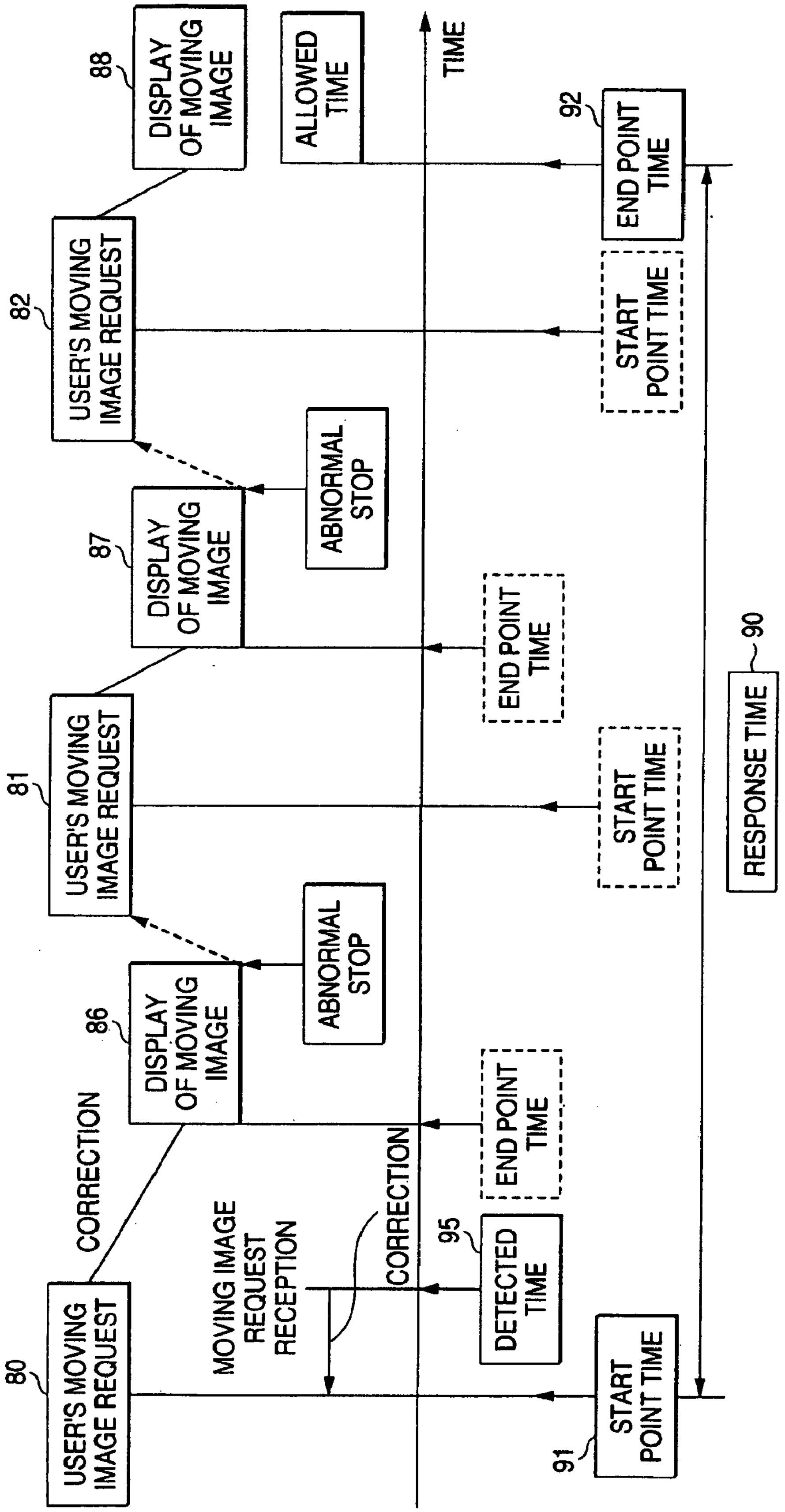
FIG. 3 is a drawing to show a response time measurement state in the communication terminal 20 in FIG. 1.
Figure 4:
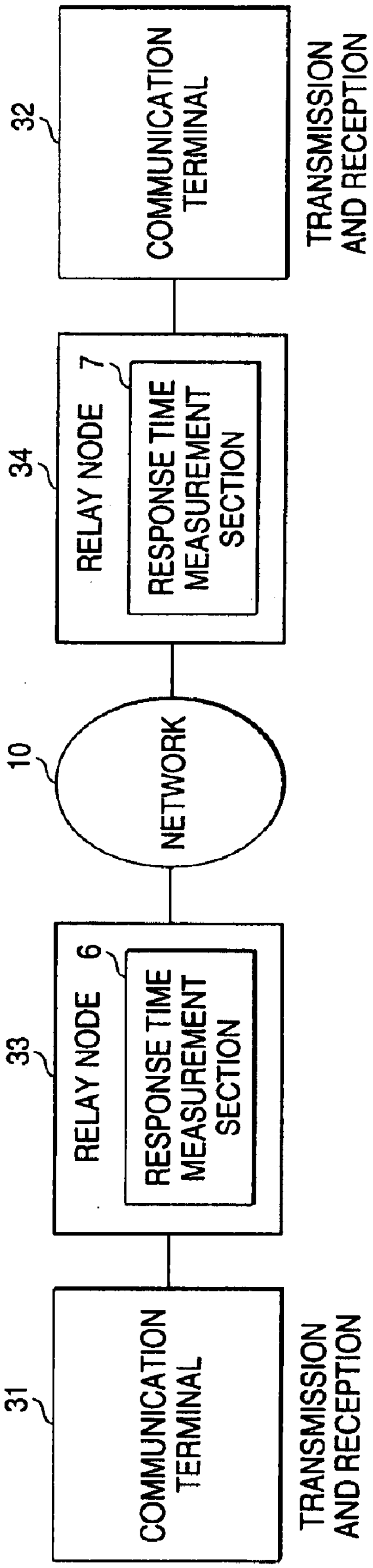
FIG. 4 is a block diagram to show a general system configuration example of a moving image communication evaluation system in a related art.
Figure 5:
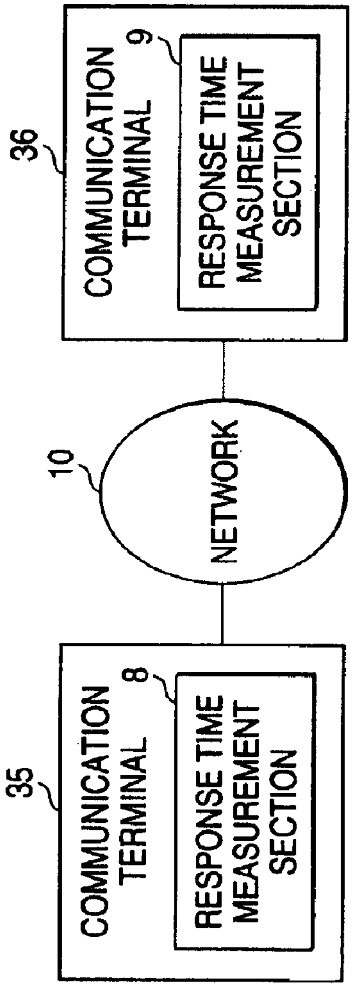
FIG. 5 is a block diagram to show a general system configuration example of a moving image communication evaluation system in a related art.

FIGS. 1 to 3 are drawings to show one embodiment of a moving image communication evaluation system incorporating the invention.

First, the configuration of the moving image communication evaluation system will be discussed.

FIG. 1 is a block diagram to show the general configuration of a moving image communication evaluation system 1 in the embodiment. In the figure, the moving image communication evaluation system 1 comprises a communication terminal 20 of a client, a communication terminal 30 of a moving image server, and an evaluation system 40, which are connected to a network 10. The client refers to a communication terminal of the user who accesses the moving image server through the network.

The network 10 is made up of, for example, the Internet, a LAN (local area network), a public telephone network, a cable television network, an optical fiber network, a cellular mobile telephone network, a satellite communication network, etc., for transmitting moving image request packets, response time data, moving image code, etc., transmitted and received among the communication terminals 20 and 30 and the evaluation system 40.

The communication terminal 20 is a client communication terminal and is made up of a moving image request section 11, a moving image display section 12, a response time data buffer 13, a moving image reception and decoding section 21, a transmission section 22, and a response time measurement section 50.

An operation section 23 is connected to the moving image request section 11. It comprises a keyboard having cursor keys, various function keys, etc., and a mouse and outputs a depress signal of the depressed key and a position signal of the mouse to the moving image request section 11. The moving image request section 11 accepts the input signal from the operation section 23 as a moving image request, prepares a moving image request packet, and outputs the moving image request packet to the transmission section 22. When the moving image request section 11 accepts the input signal from the operation section 23 as a moving image request, it outputs a request acceptance signal to a start point time measurement section 53 of the response time measurement section 50.

The moving image refers to a digital moving image consisting of a sequence of instantaneous still image frames. Moving image display normally is to display frames one after another at a specific timing from the moving image start to predetermined end if operation is not performed or if a fault does not occur. Therefore, moving image display state change such as moving image display stop or disappearance from the screen from the display state of a moving image, return to normal-speed display from the fast-forward display state of a moving image, or restarting or starting of moving image display from the stop state of moving image display or the disappearance state from the screen always occurs because of some operation, control, or fault. The moving image request means a request for changing the moving image display state. The moving image requests include various requests for display start, end, temporarily halt, restart, rewinding, fast forward, locating the start, preview, etc., of a moving image and also include a listing request, a search request, an answer request, etc., to select a content desired by the user from among a large number of contents.

The transmission section 22 transmits the moving image request packet to the communication terminal 30 through the network 10. The moving image request packet consists of a header section indicating the destination and the transmission source and a data section indicating the type of moving image request. The transmission section 22 transmits response time data input from the response time data buffer 13 to the evaluation system 40 through the network 10. When acknowledging the transmission end, the transmission section 22 outputs a transmission acknowledge signal to the response time data buffer 13.

The moving image reception and decoding section 21 receives moving image code transmitted through the network 10 from the communication terminal 30, decodes the moving image code to image data, and outputs the resultant image data to the moving image display section 12.

The moving image display section 12, which comprises a CRT (cathode ray tube) or liquid crystal display screen or the like, displays an image based on the image data input from the moving image reception and decoding section 21 and outputs a moving image display state flag to an end point time measurement section 54, a moving image display anomaly detection section 55, and a moving image display duration measurement section 56 of the response time measurement section 50. The moving image display state flag is a digital signal or data for identifying a moving image display state such as a disappearance state of moving image display from the screen, a stop state of moving image display (still image display state), a normal-speed moving image display state, a fast-forward moving image display state, a rewound moving image display state, a moving image start location display state, or a moving image preview display state.

The response time measurement section 50 (corresponding to moving image response time measurement unit as claimed in claims 1 and 2) consists of a response time calculation section 52, the above-mentioned start point time measurement section 53, the above-mentioned end point time measurement section 54, the above-mentioned moving image display anomaly detection section 55, the above-mentioned moving image display duration measurement section 56, an allowed time comparison section 57, an end point time determination section 58, and a start point time determination section 59 for measuring the response time, namely, the time interval between the instant at which a moving image request is entered through the operation section 23 and the instant at which moving image display state change is started.

The end point time measurement section 54 recognizes moving image display state change according to change in the moving image display state flag input from the moving image display section 12, measures the change time in the moving image display state by a clock section (not shown), and outputs the measured time to the end point-time determination section 58 as the end point time. The clock section may be installed in the communication terminal 20 or may be connected externally.

The moving image display anomaly detection section 55 detects an abnormal moving image display state caused by moving image display stop, display erasure, operation failure, or malfunction occurring because of an anomaly in the moving image reception and decoding section 21 or the moving image display section 12 and outputs a moving image display anomaly signal to the moving image display duration measurement section 56, the end point time determination section 58, and the start point time determination section 59 at the detection time.

For example, an overflow of a reception buffer, decoding-impossible code detection of a decoder, an overflow and an underflow of a decoder buffer, and loss of a comparatively large amount of moving image code in the moving image reception and decoding section 21 and an unrecoverable display timing anomaly and detection of display-impossible decoder output in the moving image display section 12, and the like can be named as the moving image display anomaly causes. The anomalies and faults are caused by a transmission error, packet discard, a packet reception timing anomaly, etc., at the moving image code reception time and easily occur particularly in radio communication in a poor state of transmission characteristics, a busy packet multiplex network, etc.

The moving image display duration measurement section 56 (corresponding to duration measurement means as claimed in claim 1 and duration measurement step as claimed in claim 3) recognizes moving image display state change according to change in the moving image display state flag input from the moving image display section 12, measures the change time in the moving image display state by the clock section (not shown), stores the time, and starts to measure the duration. If a moving image display anomaly signal is not input from the moving image display anomaly detection section 55, the moving image display duration measurement section 56 measures the time to recognizing of moving image display state change according to another change in the moving image display state flag input from the moving image display section 12 as the duration; if a moving image display anomaly signal is input from the moving image display anomaly detection section 55, the moving image display duration measurement section 56 measures the time to input of the moving image display anomaly signal as the duration and outputs the duration to the allowed time comparison section 57.

The allowed time comparison section 57 has a predetermined setup allowed time and compares the duration input from the moving image display duration measurement section 56 with the setup allowed time. If the duration is less than the allowed time or is equal to or greater than the allowed time, the allowed time comparison section 57 outputs the comparison result to the end point time determination section 58 and the start point time determination section 59.

If the comparison result indicating that the duration is equal to or greater than the allowed time is input from the allowed time comparison section 57, the end point time determination section 58 determines that the end point time input from the end point time measurement section 54 just before the comparison result is input is valid, and outputs the end point time to the response time calculation section 52. If the comparison result indicating that the duration is less than the allowed time is input from the allowed time comparison section 57 and a moving image display anomaly signal is input from the moving image display anomaly detection section 55, the end point time determination section 58 determines that the end point time input from the end point time measurement section 54 just before the comparison result is input is invalid, and does not outputs the end point time to the response time calculation section 52. If a moving image display anomaly signal is not input from the moving image display anomaly detection section 55 although the comparison result indicating that the duration is less than the allowed time is input from the allowed time comparison section 57, the end point time determination section 58 determines that the end point time input from the end point time measurement section 54 just before the comparison result is input is valid, and outputs the end point time to the response time calculation section 52. That is, even if the moving image display state duration is less than the allowed time, if the change in the moving image state at the time is not caused by an anomaly and is normal moving image state change responsive to a moving image request entered through the operation section 23, the end point time determination section 58 determines that the moving image display start time is valid as the end point time, and outputs the time to the response time calculation section 52.

The start point time measurement section 53 inputs a request acceptance signal from the moving image request section 11, measures the time at which the request acceptance signal is input by the clock section (not shown), previously stores the time between the instant at which the moving image request is entered through the operation section 23 and the instant at which the request acceptance signal is input to the start point time measurement section 53, and outputs the time found by subtracting the previously stored time from the time at which the request acceptance signal is input, measured by the clock section to the start point time determination section 59 as the start point time.

If the comparison result indicating that the duration is less than the allowed time is input from the allowed time comparison section 57 and a moving image display anomaly signal is input from the moving image display anomaly detection section 55, the start point time determination section 59 determines that the start point time input from the start point time measurement section 53 just after the input is invalid, and does not output the start point time to the response time calculation section 52. If the comparison result indicating that the duration is equal to or greater than the allowed time is input from the allowed time comparison section 57 or if a moving image display anomaly signal is not input from the moving image display anomaly detection section 55 although the comparison result indicating that the duration is equal to or greater than the allowed time is input from the allowed time comparison section 57, the start point time determination section 59 determines that the start point time input from the start point time measurement section 53 just after the input is valid, and outputs the start point time to the response time calculation section 52.

The response time calculation section 52 calculates the difference between the start point time input from the start point time determination section 59 and the end point time input from the end point time determination section 58 as the response time and outputs the response time to the response time data buffer 13.

As the response time is input from the response time calculation section 52 in the response time measurement section 50, the response time data buffer 13 stores the response time in order as response time data and outputs the response time data to the transmission section 22. When a transmission acknowledge signal is input from the transmission section 22, the response time data buffer 13 erases the response time data whose transmission is acknowledged by the transmission acknowledge signal.

The communication terminal 30 is a moving image server communication terminal. Upon reception of a moving image request packet transmitted through the network 10 from the communication terminal 20, the communication terminal 30 identifies the type of moving image request contained in the moving image request packet, codes image data in response to the identified moving image request type to prepare moving image code, and transmits the moving image code to the communication terminal 20.

The evaluation system 40 (corresponding to moving image response time evaluation unit) receives the response time data transmitted from the transmission section 22 in the communication terminal 20, monitors and manages the response time in the moving image service that the user of the communication terminal 20 feels, and evaluates the satisfaction degree of the user at the response time.

Next, the operation of the described moving image communication evaluation system is as follows:

FIG. 2 is a drawing to show a moving image display processing procedure in the described moving image communication evaluation system 1. As shown here, when a user's moving image request 80 is entered through the operation section 23 of the communication terminal 20, moving image request acceptance 75 at the moving image request section 11, moving image request transmission and reception 76 between the communication terminals 20 and 30, preparation for a moving image 77 of coding moving image data into moving image code, etc., in the communication terminal 30, moving image transmission and reception 78 between the communication terminals 30 and 20, and moving image decoding 79 by the moving image reception and decoding section 21 are executed, and moving image display 88 responsive to the user's request is started by the moving image display section 12.

The start point time measurement section 53 measures the time at which the moving image request acceptance 75 is executed and measures the time found by subtracting the time taken from the user's moving image request 80 to the moving image request acceptance 75 as start point time 91. The end point time measurement section 54 measures the time at which the moving image display 88 is started as end point time 92. The response time calculation section 52 measures the time between the start point time 91 and the end point time 92 as response time 90.

Next, if moving image display contains an anomaly, the operation of the moving image communication evaluation system is as follows:

FIG. 3 is a drawing to show a response time measuring procedure in the moving image communication evaluation system 1 if moving image display contains an anomaly.

For example, if the user enters user's moving image request 80 for making a request for starting moving image display through the operation section 23, the moving image request is accepted by the moving image request section 11 and a request acceptance signal is input to the start point time measurement section 53, which then measures the time at which the request acceptance signal is input. The measured time at which the request acceptance signal is input is detection time 95. The start point time measurement section 53 previously stores the time between the instant at which the moving image request is entered through the operation section 23 and the instant at which the request acceptance signal is input to the start point time measurement section 53, and subtracts the stored time from the detection time 95 for making a correction, then measures start point time 91.

When the moving image request is accepted by the moving image request section 11, the steps of the moving image request transmission and reception 76 to the moving image decoding 79 shown in FIG. 2 are executed and moving image display 86 is started by the moving image display section 12. At this time, for example, if the moving image display abnormally stops in a short time since the start of the moving image display 86 because of an anomaly such as a radio transmission error, the moving image display anomaly detection section 55 outputs a moving image display anomaly signal to the moving image display duration measurement section 56, the end point time determination section 58, and the start point time determination section 59. The moving image display duration measurement section 56 outputs a short duration to the allowed time comparison section 57. The allowed time comparison section 57 outputs the comparison result indicating that the duration is less than the allowed time to the end point time determination section 58 and the start point time determination section 59. Thus, the end point time determination section 58 determines that the start time of the moving image display 86 is invalid as the end point time from the moving image display anomaly signal and the comparison result indicating that the duration is less than the allowed time.

The user's moving image start request is not met. Then, when the user again makes a user's moving image request 81 through the operation section 23, the start point time determination section 59, to which the moving image display anomaly signal is input from the moving image display anomaly detection section 55 and the comparison result indicating that the duration is less than the allowed time is input from the allowed time comparison section 57, determines that the start point time concerning the user's moving image request 81 input from the start point time measurement section 53 just after they are input is invalid.

In response to the user's moving image request 81, the steps of the moving image request acceptance 75 to the moving image decoding 79 shown in FIG. 2 are again executed and moving image display 87 is started. After this, if the moving image display again abnormally stops in a short time because of a radio transmission error, etc., the end point time determination section 58 determines that the start time of the moving image display 87 is invalid as the end point time like the start time of the moving image display 86.

Since the user's moving image start request is not met, the user further makes a user's moving image request 82 through the operation section 23. Also in this case, the start point time determination section 59, to which the moving image display anomaly signal is input from the moving image display anomaly detection section 55 and the comparison result indicating that the duration is less than the allowed time is input from the allowed time comparison section 57, determines that the start point time concerning the user's moving image request 82 input from the start point time measurement section 53 just after they are input is invalid.

In response to the user's moving image request 82, the steps of the moving image request acceptance 75 to the moving image decoding 79 shown in FIG. 2 are again executed and moving image display 88 is started. At this time, if the radio transmission is recovered from the error and the moving image display duration measurement section 56 measures duration equal to or greater than the allowed time and outputs the duration to the allowed time comparison section 57, the allowed time comparison section 57 outputs the comparison result indicating that the duration is equal to or greater than the allowed time to the end point time determination section 58 and the start point time determination section 59. The end point time determination section 58 outputs the end point time 92 input from the end point time measurement section 54 just before the comparison result is input to the end point time determination section 58 to the response time calculation section 52.

The response time calculation section 52 calculates the difference between the start point time 91 almost equal to the time at which the user operates the operation section 23 and the end point time 92 at which the moving image display is normally started to find the response time 90 and outputs the response time data to the response time data buffer 13, then the response time data is transmitted from the transmission section 22 through the network 10 to the evaluation system 40. Thus, if an anomaly occurs in the moving image display, the response time that the user feels, namely, the time between the instant at which the user performs operation of making a moving image request and the instant at which moving image display is normally started can be measured and evaluated in response to the moving image display anomaly.

Thus, when a moving image request is entered through the operation section 23, the moving image request section 11 accepts the moving image request and the transmission section 22 transmits the moving image request through the network 10 to the communication terminal 30. On the other hand, the start point time measurement section 53 measures the time at which the moving image request is entered through the operation section 23 as the start point time, and the start point time determination section 59 determines whether the time is valid or invalid as the start point time. If the comparison result input from the allowed time comparison section 57 indicates that the duration is less than the allowed time and a moving image display anomaly signal is input from the moving image display anomaly detection section 55, the start point time just after they are input is determined invalid; if the comparison result indicating that the duration is equal to or greater than the allowed time is input from the allowed time comparison section 57 and a moving image display anomaly signal is not input from the moving image display anomaly detection section 55, the start point time just after the input is determined valid and is output to the response time calculation section 52.

When moving image code is transmitted from the communication terminal 30 through the network 10, the moving image reception and decoding section 21 receives the moving image code and decodes the code to image data, and the moving image display section 12 executes moving image display. The end point time measurement section 54 measures the time at which the moving image display is started, the moving image display duration measurement section 56 measures the duration of the moving image display, and the allowed time comparison section 57 compares the duration with the preset allowed time. The end point time determination section 58 determines whether the end point time measured by the end point time measurement section 54 is valid or invalid according to the comparison result of the allowed time comparison section 57. If the comparison result indicating that the duration is less than the allowed time is input from the allowed time comparison section 57 and a moving image display anomaly signal is input from the moving image display anomaly detection section 55, the end point time determination section 58 determines the end point time invalid; if a moving image display anomaly signal is not input from the moving image display anomaly detection section 55 and the comparison result indicating that the duration is equal to or greater than the allowed time is input from the allowed time comparison section 57, the end point time determination section 58 determines the end point time valid and outputs the end point time to the response time calculation section 52.

The response time calculation section 52 calculates the difference between the start point time and the end point time as the response time and outputs the response time to the response time data buffer 13, then the response time is transmitted from the transmission section 22 through the network 10 to the evaluation system 40. The evaluation system 40 receives the response time data and evaluates the satisfaction degree of the user at the response time and the like, thereby monitoring and managing the response time in the moving image service.

Therefore, even when a moving image display anomaly easily occurs in a communication environment wherein a transmission error and packet discard often occur, such as radio communication or the Internet, it is made possible to measure and evaluate the response time that the user feels, namely, the time between the instant at which the user performs operation of making a moving image request and the instant at which the user feels chat moving image display is changed exactly as the moving image request.

Since relay nodes, etc., are not required and the communication terminal 30 of the server terminal need not be provided with any response time measurement section, the moving image communication evaluation system can cover various network types; if network change frequently occurs, the response time measurement section 50 need not be improved or again evaluated each time and it is made possible to measure and evaluate the response time that the user feels in response to the variety of networks and the network change.

In the embodiment, each moving image request accepted by the moving image request section 11 is transmitted as a moving image request packet from the transmission section 22 through the network 10 to the communication terminal 30, but the scope of the invention is not limited to the form. For example, the communication terminal 20 may further include a moving image request processing section, etc., and it may be made possible to process a moving image request and change the moving image display state in the communication terminal 20 depending on the type of moving image request; the composition and arrangement of parts may be resorted to without departing from the spirit and scope of the invention.

According to the present invention, since the moving image response time measurement unit is installed in the client communication terminal, it is made possible to easily measure and evaluate the response time in the moving image communication in response to the variety of networks and the network change. Since the time between the moving image request and moving image display state change can be measured as the response time, the response time almost equal to the response time that the user feels can be measured and it is made possible to more accurately evaluate the satisfaction degree of the user at the response time.

According to the present invention, although the moving image display state is changed in response to the moving image request, if the moving image display stops in a short time because of a moving image display anomaly or a malfunction occurs and the user does not feel that the moving image display state is changed as requested, measurement of the response time is continued. If the moving image display state changed in response to a moving image request continues for the predetermined allowed time or longer from the time at which the moving image request is accepted or an anomaly does not occur, the time to the moving image display state change time is measured as the response time. Thus, even when a moving image display anomaly easily occurs in a communication environment, etc., wherein a transmission error and packet discard often occur, the response time that the user feels can be measured in response to the moving image display state change caused by an anomaly, and the satisfaction degree of the user at the response time can be evaluated.

According to the present invention, the time between the instant at which the moving image request is input to the client communication terminal and the instant at which the moving image display state is changed can be measured as the response time. Thus, the response time that the user feels can be measured more accurately and the satisfaction degree of the user at the response time can be evaluated more accurately.

What is claimed is:

1. A moving image communication evaluation system comprising:

(a) a moving image response time measurement unit installed in a client communication terminal for transmitting a moving image request to a moving image server communication terminal connected to the client communication terminal via a network and receiving and displaying a moving image transmitted from the moving image server communication terminal in response to the moving image request, said moving image response time measurement unit for measuring response time between the moving image request and moving image display state change, wherein the moving image response time measurement unit comprises:

start point time measurement means for measuring time at which the client communication terminal accepts the moving image request as a start point time;

end point time measurement means for measuring time at which a moving image display state is changed in accordance with the moving image request as an end point time;

response time calculation means for calculating the time between the start point time and the end point time as the response time, moving image display anomaly detection means for detecting an anomaly of moving image display; and duration measurement means for measuring the time during which the moving image display continues normally; and (b) a moving image response time evaluation unit for receiving the response time transmitted from said moving image response time measurement unit through the network and evaluating the response time in the moving image communication between the moving image server communication terminal and the client communication terminal wherein the moving image response time evaluation unit receives the response time transmitted from the moving image response time measurement unit and evaluates a satisfaction degree of a user based on the response time, and wherein if an anomaly is detected by the moving image display anomaly detection means and the duration measured by the duration measurement means is less than a predetermined allowed time, the end point time measurement means determines the measured end point time invalid, if an anomaly is not detected by the moving image display anomaly detection means and the duration measured by the duration measurement means is equal to or greater than the predetermined allowed time, the end point time measurement means determines the measured end point time valid and measures the end point time, if an anomaly is detected by the moving mage display anomaly detection means and the duration measured by the duration measurement means is less than the predetermined allowed time, the start point time measurement means determines that the start point time measured just after it is invalid, and if an anomaly is not detected by the moving image display anomaly detection means and the duration measured by the duration measurement means is equal to or greater than the predetermined allowed time, the start point time measurement means determines that the start point time measured just after it is valid, and measures the start point time.

2. A moving image communication evaluation system comprising:

(a) a moving image response time measurement unit installed in a client communication terminal for transmitting a moving image request to a moving image server communication terminal connected to the client communication terminal via a network and receiving and displaying a moving image transmitted from the moving image server communication terminal in response to the moving image request, said moving image response time measurement unit for measuring response time between the moving image request and moving image display state change, wherein the moving image response time measurement unit comprises:

start point time measurement means for measuring time at which the client communication terminal accepts the moving image request as a start point time;

end point time measurement means for measuring time at which a moving image display state is changed in accordance with the moving image request as an end point time; and response time calculation means for calculating the time between the start point time and the end point time as the response time, (b) a moving image response time evaluation unit for receiving the response time transmitted from said moving image response time measurement unit through the network and evaluating the response time in the moving image communication between the moving image server communication terminal and the client communication terminal, (c) storage means for previously storing a time interval between the instant at which the moving image request is input to the client communication terminal and the instant at which the moving image request is accepted in the client communication terminal; and (d) start point time correction means for subtracting the time interval stored in the storage means from the start point time measured by the start point time measurement means, thereby correcting the start point time, wherein the response time calculation means calculates the response time based on the start point time corrected by the start point time correction means, and wherein the moving image response time evaluation unit receives the response time transmitted from the moving image response time measurement unit and evaluates a satisfaction degree of a user based on the response time.

3. A moving image communication evaluation method for measuring a response time between a moving image request and a moving image display state change in a client communication terminal for transmitting the moving image request to a moving image server communication terminal connected to the client communication terminal via a network and receiving and displaying a moving image transmitted from the moving image server communication terminal in response to the moving image request, then receiving the response time through the network and evaluating the response time in the moving image communication between the moving image server communication terminal and the client communication terminal, said moving image communication evaluation method comprising:

measuring a time at which the client communication terminal accepts the moving image request as a start point time;

measuring a time at which a moving image display state is changed in accordance with the moving image request as an end point time;

calculating the time between the start point time and the end point time as the response time, thereby measuring the response time;

receiving the response time;

evaluating a satisfaction degree of a user based on the response time;

detecting an anomaly of moving image display; and measuring the time during which the moving image display continues normally, wherein, if an anomaly is detected by the moving image display anomaly detection step and the duration measured by the duration measurement step is less than a predetermined allowed time, the end point time measurement step determines the measured end point time invalid, if an anomaly is not detected by the moving image display anomaly detection step and the duration measured by the duration measurement step is equal to or greater than the predetermined allowed time, the end point time measurement step determines the measured end point time valid and measures the end point time, if an anomaly is detected by the moving image display anomaly detection step and the duration measured by the duration measurement step is less than the predetermined allowed time, the start pint time measurement step determines that the start point time measured just after it is invalid, and if an anomaly is not detected by the moving image display anomaly detection step and the duration measured by the duration measurement step is equal to or greater than the predetermined allowed time, the start point time measurement step determines that the start point time measured just after it is valid, and measures the start ed point time.

4. A moving image communication evaluation method for measuring a response time between a moving image request and a moving image display state change in a client communication terminal for transmitting the moving image request to a moving image server communication terminal connected to the client communication terminal via a network and receiving and displaying a moving image transmitted from the moving image server communication terminal in response to the moving image request, then receiving the response time through the network and evaluating the response time in the moving image communication between the moving image server communication terminal and the client communication terminal, said moving image communication evaluation method comprising:

measuring a time at which the client communication terminal accepts the moving image request as a start point time;

storing a time interval between the instant at which the moving image request is input to the client communication terminal and the instant at which the moving image request is accepted in the client communication terminal;

subtracting the time interval stored in the storage step from the start point time measured by the start point time measurement step;

correcting the start point time, measuring a time at which a moving image display state is changed in accordance with the moving image request as an end point time;

calculating the time between the start point time and the end point time as the response time, thereby measuring the response time, wherein the response time calculation step calculates the response time based on the start point time corrected by the start point time correction step;

receiving the response time; and evaluating a satisfaction degree of a user based on the response time.

* * * * *